(12) United States Patent
Huelsen et al.

(10) Patent No.: US 12,187,242 B2
(45) Date of Patent: Jan. 7, 2025

(54) ROOF MODULE HAVING AN ENVIRONMENT SENSOR FOR AUTONOMOUS OR PARTIALLY AUTONOMOUS VEHICLE OPERATION

(71) Applicant: Webasto SE, Stockdorf (DE)

(72) Inventors: Michael Huelsen, Stockdorf (DE); Johannes Thannheimer, Stockdorf (DE); Max Huber, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 423 days.

(21) Appl. No.: 17/632,622

(22) PCT Filed: Jul. 30, 2020

(86) PCT No.: PCT/EP2020/071537
§ 371 (c)(1),
(2) Date: Feb. 3, 2022

(87) PCT Pub. No.: WO2021/032436
PCT Pub. Date: Feb. 25, 2021

(65) Prior Publication Data
US 2022/0289146 A1    Sep. 15, 2022

(30) Foreign Application Priority Data

Aug. 19, 2019 (DE) ..................... 10 2019 122 202.8

(51) Int. Cl.
*B62D 25/06* (2006.01)
*B60J 7/22* (2006.01)
(Continued)

(52) U.S. Cl.
CPC . *B60S 1/56* (2013.01); *B60J 7/22* (2013.01); *B60S 1/04* (2013.01); *B60S 1/46* (2013.01);
(Continued)

(58) Field of Classification Search
CPC ... B60S 1/56; B62D 25/06; B60J 7/22; G06V 20/56
(Continued)

(56) References Cited

U.S. PATENT DOCUMENTS 10,569,721 B2 * 2/2020 Frederick ............. G05D 1/0231
2013/0285418 A1 * 10/2013 Katayama .............. B60J 7/0084
296/213

(Continued)

FOREIGN PATENT DOCUMENTS

CN          101020449 A    8/2007
CN          109835306 A    6/2019
(Continued)

OTHER PUBLICATIONS

DE202018103125 (Year: 2018).*
(Continued)

*Primary Examiner* — Dennis H Pedder
(74) *Attorney, Agent, or Firm* — Fitch, Even, Tabin & Flannery, LLP

(57) ABSTRACT

A roof module for a motor vehicle, in particular a passenger car, is proposed, the roof module having a roof cladding, which forms an outer visible surface of the roof module, and at least one sensor module having an environment sensor for sensing a vehicle environment during an autonomous or partially autonomous operation of the motor vehicle. A viewing area can be formed in the roof cladding for the environment sensor and the viewing area can be provided with a cleaning element.

12 Claims, 5 Drawing Sheets

(51) Int. Cl.
  *B60S 1/04* (2006.01)
  *B60S 1/46* (2006.01)
  *B60S 1/56* (2006.01)
  *G05D 1/00* (2006.01)
  *G06V 20/56* (2022.01)

(52) U.S. Cl.
  CPC ........... *B62D 25/06* (2013.01); *G05D 1/0088* (2013.01); *G06V 20/56* (2022.01)

(58) Field of Classification Search
  USPC ................................................. 296/210, 217
  See application file for complete search history.

(56) References Cited

U.S. PATENT DOCUMENTS

| | | |
|---|---|---|
| 2016/0121855 A1 | 5/2016 | Doorley et al. |
| 2016/0244028 A1 | 8/2016 | Wakatsuki |
| 2017/0151933 A1 | 6/2017 | Doorley et al. |
| 2018/0011173 A1 | 1/2018 | Newman |
| 2018/0370500 A1 | 12/2018 | Garcia Crespo et al. |
| 2019/0003895 A1 | 1/2019 | Krishnan et al. |
| 2019/0054855 A1 | 2/2019 | Krishnan et al. |
| 2019/0077376 A1 | 3/2019 | Baldovino et al. |
| 2019/0126891 A1 | 5/2019 | Kondo |
| 2019/0161125 A1 | 5/2019 | Schmidt |
| 2019/0232315 A1 | 8/2019 | Mousavi Ehteshami et al. |
| 2020/0010055 A1 | 1/2020 | Berne |

FOREIGN PATENT DOCUMENTS

| | | | |
|---|---|---|---|
| DE | 602005000277 T2 | 3/2007 | |
| DE | 602005002544 T2 | 6/2008 | |
| DE | 10 2016 200 835 A1 | 8/2016 | |
| DE | 102016006039 A1 | 11/2016 | |
| DE | 10 2016 220 011 A1 | 4/2018 | |
| DE | 20 2018 103 489 U1 | 7/2018 | |
| DE | 202018103125 U1 * | 8/2018 | ............. B05B 15/70 |
| DE | 102018115498 A1 | 1/2019 | |
| DE | 10 2018 119 863 A1 | 2/2019 | |
| DE | 10 2018 121 812 A1 | 3/2019 | |
| DE | 10 2018 129 839 A1 | 5/2019 | |
| DE | 10 2019 102 092 A1 | 8/2019 | |
| JP | H07196016 A | 8/1995 | |
| KR | 20180127522 A | 11/2018 | |
| WO | 2018206997 A1 | 11/2018 | |

OTHER PUBLICATIONS

International Search Report for PCT/EP2020/071537 mailed Nov. 5, 2020, in English and German (7 pages).
Translation of International Search Report and Written Opinion for PCT/EP2020/071537 mailed Feb. 17, 2022, English (9 pages).

* cited by examiner

ROOF MODULE HAVING AN ENVIRONMENT SENSOR FOR AUTONOMOUS OR PARTIALLY AUTONOMOUS VEHICLE OPERATION

CROSS-REFERENCE TO RELATED APPLICATION

This application is a U.S. national phase application filed under 35 U.S.C. § 371 of International Application No. PCT/EP2020/071537, filed Jul. 30, 2020, designating the United States, which claims priority from German Patent Application Number 10 2019 122 202.8 filed on Aug. 19, 2019, which is hereby incorporated herein by reference in its entirety for all purposes.

FIELD

This invention relates to a roof module of a motor vehicle, in particular a passenger car, the roof module comprising the features of the preamble of claim 1.

BACKGROUND

From practice, roof modules are known which can form a vehicle roof in particular for passenger cars, the vehicle roof being able to be placed on top of a vehicle chassis forming the vehicle shell construction as a separate component. These kinds of roof modules can be designed as a solid roof having a roof cladding entirely connected to the chassis or can comprise a roof opening system comprising a lid element, by means of which a roof opening can either be closed or opened.

Furthermore, disposing sensor modules on a vehicle roof, which can also be realized as a roof module, has been known, the sensor modules enabling driving the motor vehicle in question autonomously or partially autonomously and comprising driver assistance. The sensor modules which comprise environment sensors for monitoring and sensing the vehicle environment are fastened to the vehicle roof since the vehicle roof generally constitutes the highest point of a vehicle, the vehicle environment being clearly visible from this vantage point. Hitherto, the sensor modules have been designed as a topper on the vehicle roof in question. This leads to a visual appearance which in general does not meet customer demands. Moreover, there is a risk of the visible area, through which the environment sensor senses the vehicle environment, becoming dirty or opaque due to environmental and weather influences.

SUMMARY

The object of the invention is to create a roof module for a motor vehicle, in particular for a passenger car, which is suitable for use in a self-driving or partially self-driving motor vehicle and allows using an environment sensor even under harsh conditions.

According to the invention, this object is attained by the roof module having the features of claim 1.

According to the invention, a roof module is proposed where a viewing area is formed in a roof cladding for the environment sensor and the viewing area is provided with a cleaning element. The environment sensor is thus protected by the roof cladding at least in areas, the viewing area of the roof cladding being able to be kept clean by means of the cleaning element, the viewing area thus remaining transparent for the environment sensor. Any kind of dirt or even snow, water and/or ice and other materials caused by the environment, for example, and impairing the view can be removed by the cleaning element.

The roof module as intended by the invention reflects in particular a vehicle roof in an integrated manner, the components required for autonomously or partially autonomously driving the vehicle in question being contained in the vehicle roof. The invention thus provides a sensor roof or roof sensor module (RSM) which enables both autonomously and partially autonomously driving the vehicle in question and covering the sensor module at least partially via the roof cladding and the possibly required cleaning of the viewing area provided on the roof cladding by means of the cleaning element.

The roof module according to the invention can form a construction unit in which a plurality of functional elements is integrated and which can be connected to a vehicle chassis or a vehicle shell construction in the manner of a module for realizing the vehicle roof.

In general, the environment sensor of the sensor module of the roof module according to the invention can be designed in various manners and can comprise a LiDAR sensor, a radar sensor, an optical sensor, such as a camera, and/or the like. LiDAR sensors work in a wavelength range of 905 nm or even 1,550 nm, for example. The material of the roof cladding in the viewing area must be transparent to the wavelength range used by the at least one environment sensor; hence, it must be chosen depending on the wavelength used be the environment sensor.

In a preferred embodiment of the roof module according to the invention, the cleaning element comprises a fluid nozzle, which upon actuation produces a fluid cone striking the viewing area from the outside. The fluid nozzle can be supplied with a cleaning fluid, which can be sprayed onto the viewing area of the roof cladding by means of the nozzle, thus cleaning and/or also drying the intended area.

The viewing area of the roof cladding can be formed on a step of the roof cladding, the fluid nozzle preferably being disposed on the roof cladding in front of the step. If the viewing area is formed in an end area of the roof cladding in the vehicle's front, the fluid nozzle is located on the roof cladding in the vehicle's front in front of the step. If the viewing area is formed at a step in the roof cladding in the vehicle's rear, the fluid nozzle is located on the roof cladding to the rear of the step.

The step can also serve as a guide surface for the cleaning fluid delivered to the roof viewing area by the fluid nozzle with the result that the cleaning fluid is preferably guided toward the vehicle side and away from the vehicle center. For this purpose, the step forms in particular an end surface on which the viewing area is formed and which is curved toward the vehicle's rear. The airstream guides the cleaning fluid on the end surface to the sides. The curvature at a step disposed in the rear area can be directed in opposite directions, i.e., be directed to the vehicle's front.

In a special embodiment of the roof module according to the invention, the fluid nozzle is extractable for actuation and is preferably formed on a nozzle bar, which is extracted in particular by means of a pressure exerted by the fluid and/or by a different drive means against a return force.

To reduce the risk of cleaning fluid entering the vehicle's interior via the roof opening in a roof module having a roof opening, the extractable fluid nozzle advantageously produces a fluid cone upon actuation whose cone axis is directed toward the vehicle's front and/or transversally to the direction of travel.

Obviously, the term "fluid cone" is to be understood in its broadest sense in this context and also pertains to spraying forms which are not entirely conical, such as a pyramid shape, a water-stream shape or any other shape. The respective spraying form depends on the conceptualization of the fluid nozzle.

To be able to drain the fluid applied by the fluid nozzle in a defined form and to prevent certain vehicle areas from being subjected to the fluid unintendedly, a preferred embodiment of the roof module according to the invention comprises a deflection element for the fluid.

As described above, a guide surface can form a deflection element formed on the roof cladding. For instance, an end surface of a step, which forms the viewing area for the environment sensor, is such a guide surface.

In a specific embodiment of the roof module according to the invention, the deflector element comprises an extension element, which is extended upon actuation of the fluid nozzle. In particular an extension element of this kind can prevent the fluid from unintendedly striking critical vehicle areas or even passers-by who happen to be in the environment of the vehicle in question.

The roof module according to the invention can be an entirely solid-roof element or also comprise a roof opening which can either be closed or opened by means of a roof lid element of a roof opening system. The roof opening system can be a spoiler roof, an external retractable roof or a lift-and-slide retractable roof.

If the roof opening system comprises a wind deflector, it can be used in such a manner that fluids, which are delivered by the fluid nozzle, do not enter the vehicle interior via the roof opening. For this purpose, the wind deflector can comprise or form a fluid collection element and/or a drain element. The fluid collection element and/or the drain element is, for example, realized by a wind deflector element, such as a deflector lamella or a wind deflector net.

In another special embodiment of the roof module according to the invention, the roof cladding comprises a front roof visor, which forms a front windshield cowl of the vehicle in question and is disposed on the cleaning element. The roof visor can also be an upper cover for the sensor module and provide the viewing area for the environment sensor.

In general, the roof cladding of the roof module according to the invention can be made in one or multiple pieces. The viewing area can be formed by a separate component or even in one piece by the roof cladding.

Further advantages and advantageous embodiments of the subject matter of the invention can be derived from the description, the drawing and the claims.

An exemplary embodiment of a roof module according to the invention is shown in the drawing in a schematically simplified manner and is described in further detail in the following description.

BRIEF DESCRIPTIONS OF THE DRAWINGS

DETAILED DESCRIPTION

Figure 1:
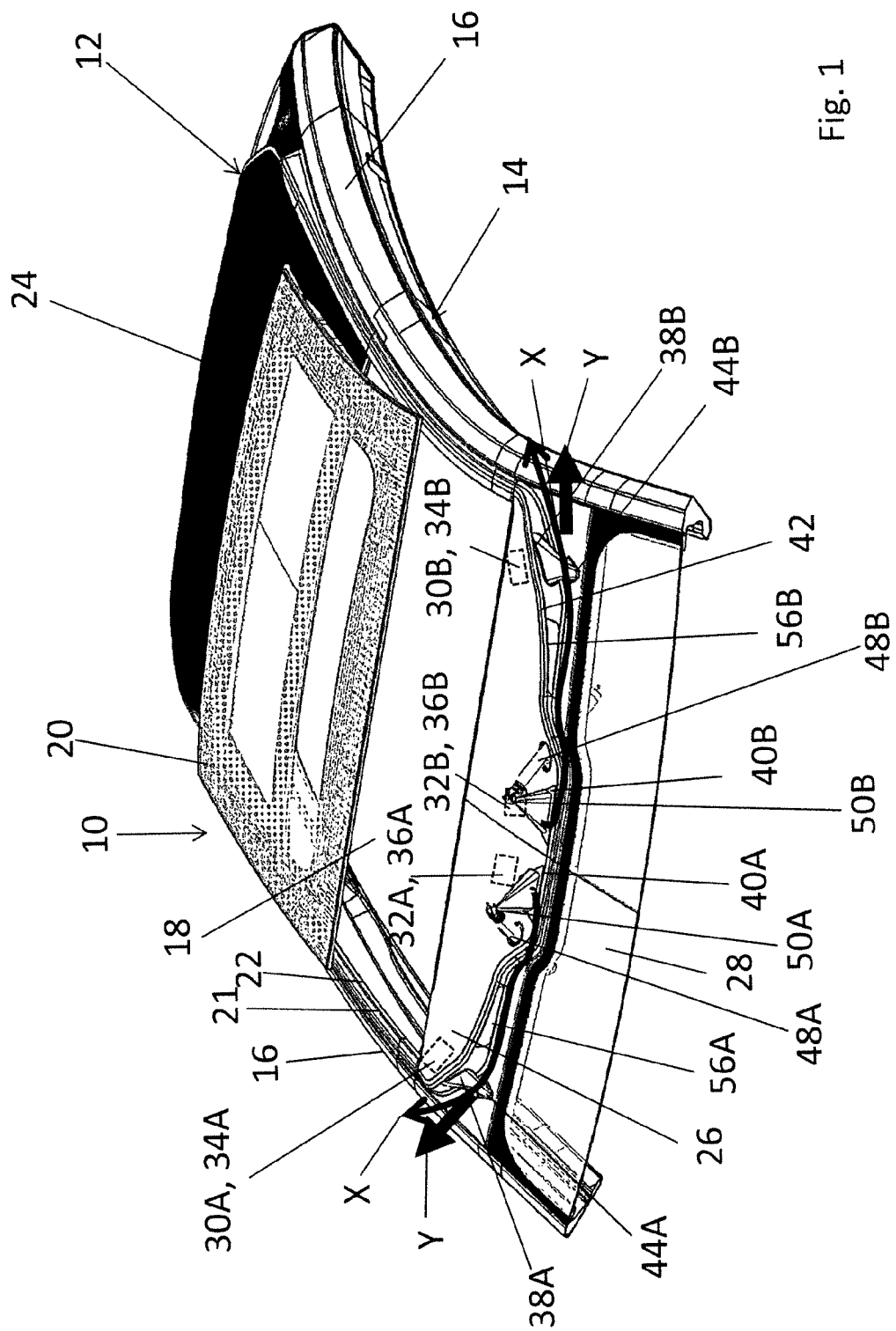
FIG. 1 is a perspective overall view of a vehicle roof having a roof module according to the invention.

In the drawing, a vehicle roof 10 of a motor vehicle realized as a passenger car is shown, vehicle roof 10 comprising a roof module 12, which is placed on top of a vehicle shell construction 14, which comprises a longitudinal roof beam 16, among other things, on each of its two sides with respect to a vertical longitudinal vehicle center plane.

Roof module 12 is a roof sensor module (RSM) which is equipped with devices enabling autonomously driving the motor vehicle in question.

As can be seen in the drawing, roof module 12 comprises a roof opening 18, which can be either opened or closed by means of a lid element 20 movable in the longitudinal vehicle direction. For this purpose, lid element 20 is stored on both of its two sides on a guide rail 21 which is a component of a roof frame 22 which is a support structure of roof module 12. To the rear of roof opening 18, roof module 12 comprises a roof cladding section 24 forming a solid-roof element.

To the front of roof opening 18, roof module 12 comprises a roof cladding section 26, which is a roof visor and forms a front windshield cowl of the motor vehicle in question, the front windshield cowl extending in the transverse roof direction and being a transverse leg of a frame of a windshield 28.

Below roof cladding section 26, several sensor modules 30A, 30B, 32A and 32B are disposed, each comprising an environment sensor 34A, 34B, 36A and 36B, respectively. Environment sensors 34A and 34B are each realized as LiDAR sensors which work with a wavelength of 905 nm or 1,550 nm. Both environment sensors 36A and 36B each form a camera, which can be realized as a mono/multi/multifocal and/or stereo camera. The cameras of environment sensors 36A and 36B function in the visible and near-infrared range.

Roof cladding section 26 forms a viewing area 38A, 38B, 40A and 40B in the area of each sensor module 30A, 30B, 32A and 32B, respectively; viewing areas 38A, 38B, 40A and 40B being transparent to wavelengths between 300 nm and 2,000 nm and in particular radar radiation.

Figure 2:
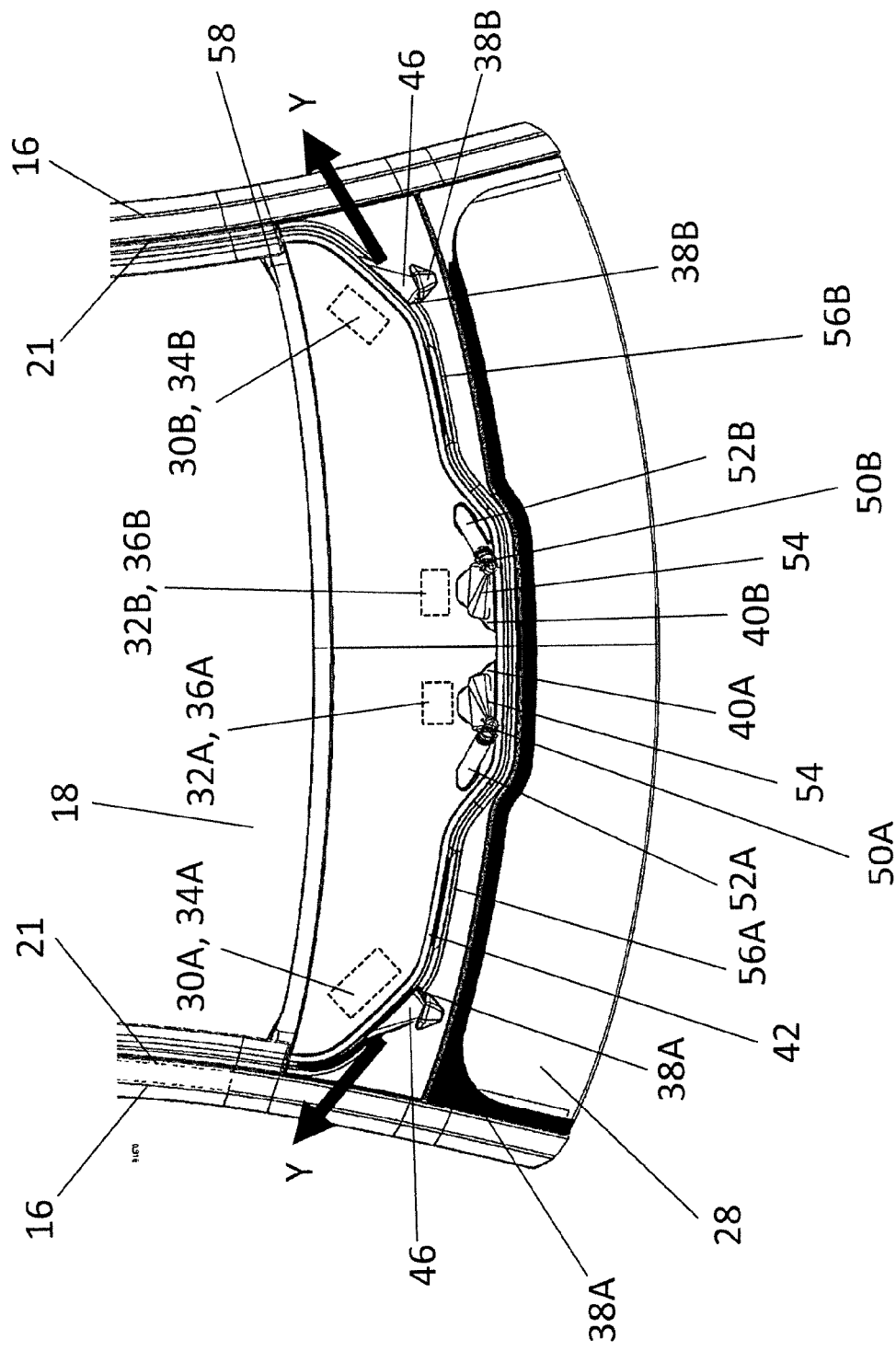
FIG. 2 is a top view of a front area of the vehicle roof.
Figure 3:
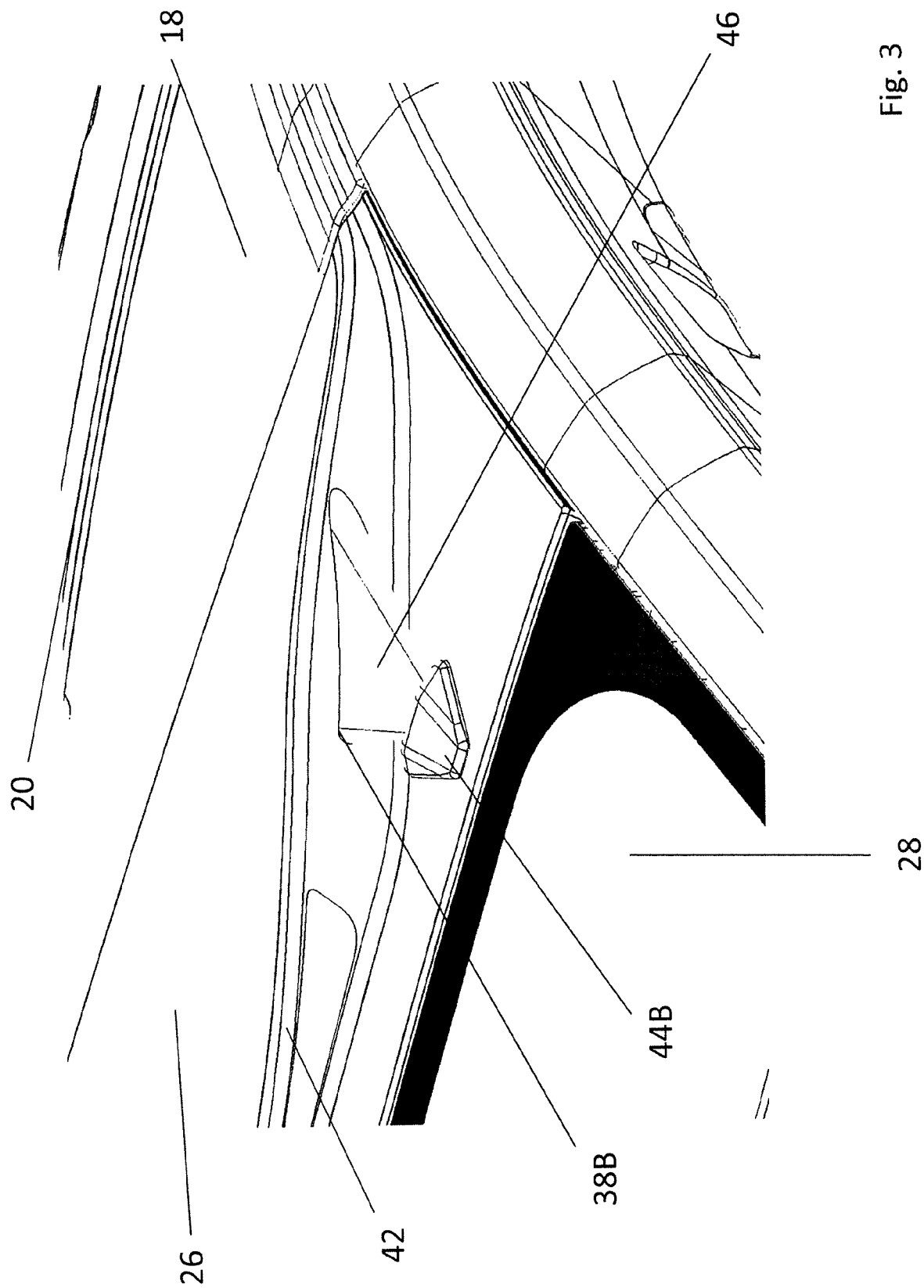
FIG. 3 is a perspective view of a front left section of the vehicle roof.
Figure 4:
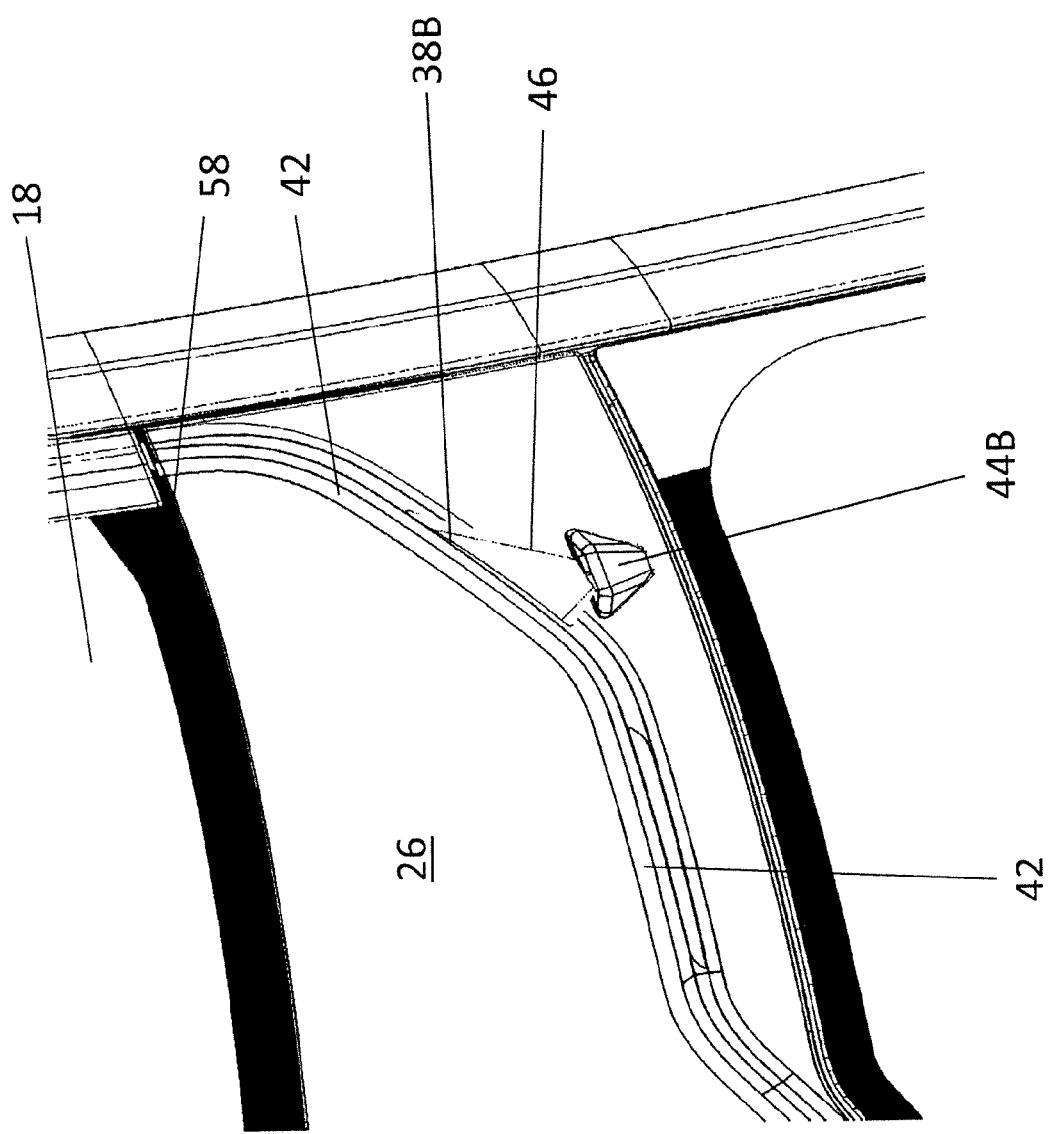
FIG. 4 is a top view of the section according to FIG. 3.
Figure 5:
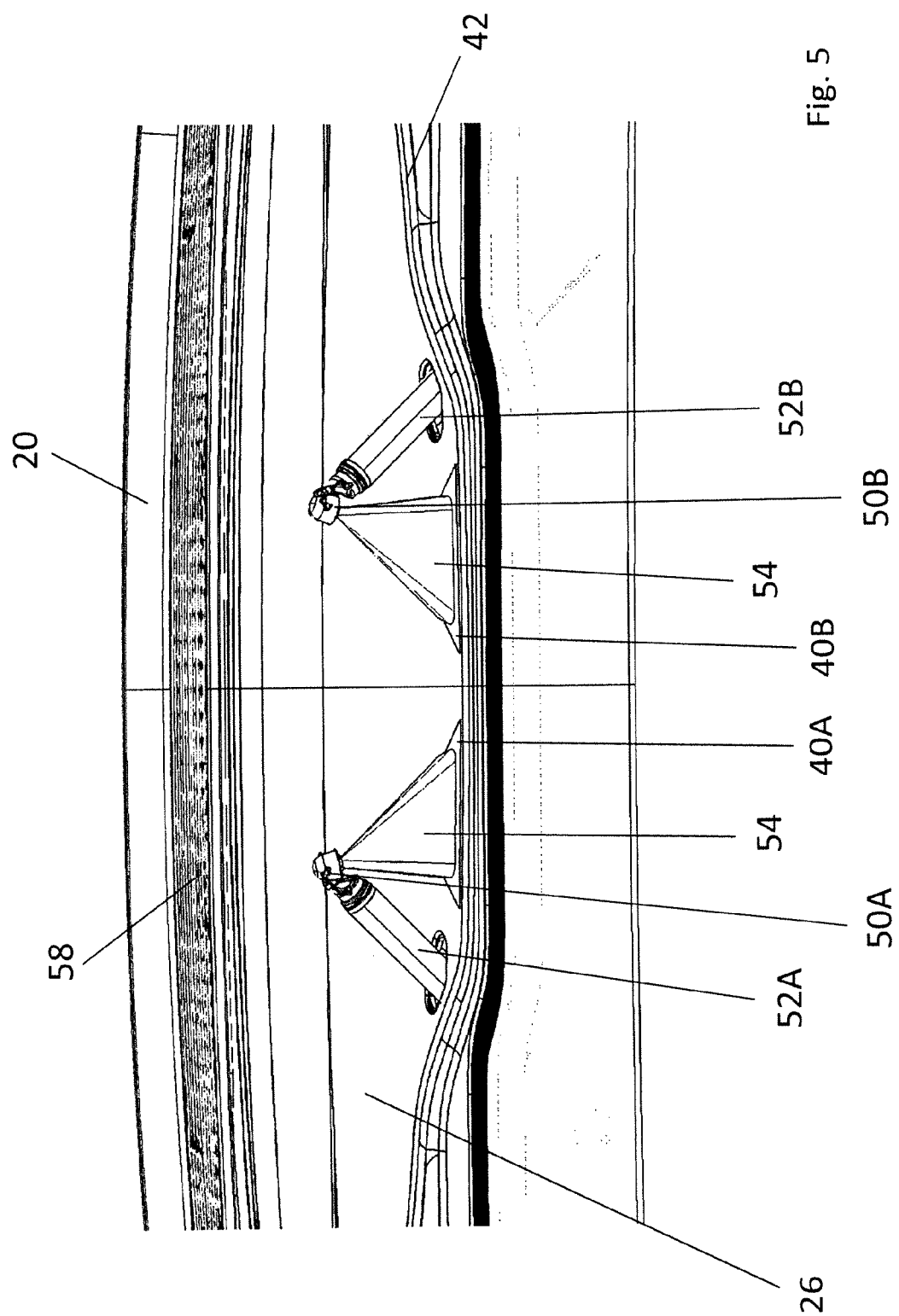
FIG. 5 is a front view of a central front section of the vehicle roof.

The visor formed by roof cladding section 26 has a step 42, which, as can be seen in FIG. 2, is symmetrical with respect to the longitudinal vehicle center plane and extends toward the rear from the longitudinal vehicle center plane. Viewing areas 38A and 38B are disposed on an end surface of step 42 in a corresponding front corner area of roof module 12. Viewing areas 40A and 40B are formed symmetrically to each other on the upper side of roof cladding section 26 close to the longitudinal vehicle center plane.

In order to be able to keep viewing areas 38A and 38B clean, roof module 12 comprises a fluid nozzle 44A and 44B to the front of step 42, corresponding viewing areas 38A and 38B being able to be subjected to a pressurized cleaning fluid by means of fluid nozzles 44A and 44B, respectively. When in use, fluid nozzles 44A and 44B each produce a fluid or spray cone 46, which completely covers respective viewing area 38A and 38B while remaining below the edge of step 42. By forming fluid cone 46 and via step 42, the cleaning fluid is transported toward the vehicle side during operation of the corresponding vehicle, without running the risk of the cleaning fluid entering the vehicle interior when roof opening 18 is open (cf. arrow Y in FIGS. 1 and 2). Furthermore, an extractable wind deflector 58 disposed in the front edge area of roof opening 18 serves as a fluid collection element and/or drain element.

For both middle viewing areas 40A and 40B, roof module 12 comprises a cleaning element 48A and 48B, respectively, which are provided with a fluid nozzle 50A and 50B, respectively, formed on an end of a nozzle bar 52A and 52B, respectively. Nozzle bars 52A and 52B are extractable to the operation position shown in the drawing, namely by means of a pressure which is exerted by a cleaning fluid on nozzle bars 52A and 52B and acts on nozzle bars 52A and 52B in particular by a return force exerted by a return spring.

During operation, fluid nozzles 50A and 50B each produce a fluid or spray cone 54 which covers the respective viewing area 40A and 40B and has a cone axis angled frontward toward the vehicle front and transversally to the longitudinal vehicle direction. This minimizes the risk of the cleaning fluid forming fluid cone 54 from entering the vehicle interior via roof opening 18 during operation of the vehicle when lid element 20 is opened. Moreover, the cleaning fluid delivered by fluid nozzles 50A and 50B is drained laterally outward along the end surface of step 42 according to arrows X shown in FIG. 1.

Furthermore, roof module 12 comprises an illuminate pane 56A and 56B on each of its two sides between both viewing areas 38A and 40A and viewing areas 38B and 40B, respectively, in the embodiment at hand, illuminated panes 56A and 56B being allocated to ADS (autonomous drive signal) lights which indicate whether the self-driving mode of the vehicle in question is active.

The invention claimed is:

1. A roof module of a motor vehicle, the roof module comprising:
    a roof cladding, which forms an outer visible surface of the roof module, and
    at least one sensor module having an environment sensor for sensing a vehicle environment during an autonomous or partially autonomous operation of the motor vehicle,
    wherein a viewing area is formed in the roof cladding for the environment sensor and in that the viewing area is provided with a cleaning element,
    wherein the roof module further comprises a roof opening, which is either closed or opened by means of lid element of a roof opening system, and
    wherein the cleaning element comprises a fluid nozzle which upon actuation produces a fluid cone, which strikes the viewing area from the outside,
    wherein a wind deflector of the roof opening system comprises or forms a fluid collector element and/or a drain element, and
    wherein the roof module forms a construction unit configured to be connected to a vehicle body in the manner of a module to form a vehicle roof.

2. The roof module according to claim 1, wherein the cleaning element comprises a fluid nozzle which upon actuation produces a fluid cone, which strikes the viewing area from the outside.

3. The roof module according to claim 2, wherein the viewing area is formed at a step or a reclining surface of the roof cladding and in that the fluid nozzle is disposed on the roof cladding in front of the step or the reclining surface.

4. The roof module according to claim 2, wherein the fluid nozzle is extractable for actuation.

5. The roof module according to claim 2, wherein the fluid nozzle produces a fluid cone whose cone axis is directed toward the vehicle front and/or whose cone axis is at least partially oriented transversally to the longitudinal roof direction.

6. The roof module according to claim 2, further comprising a deflection unit for the fluid delivered by the fluid nozzle.

7. The roof module according to claim 2, wherein the deflection unit comprises a guide surface formed on the roof cladding.

8. The roof module according to claim 6, wherein the deflection unit comprises an extension element, which extends when the fluid nozzle is actuated.

9. The roof module according to claim 1, wherein the roof cladding comprises a front roof visor, which forms a front windshield cowl of the vehicle in question and on which the cleaning element is disposed, and/or comprises a rear roof visor.

10. A vehicle comprising a roof module according to claim 1.

11. The roof module according to claim 4, wherein the fluid nozzle disposed on a nozzle bar is extracted by a pressure exerted by the fluid against a return force.

12. A roof module of a motor vehicle, the roof module comprising:
    a roof cladding, which forms an outer visible surface of the roof module, and
    at least one sensor module having an environment sensor for sensing a vehicle environment during an autonomous or partially autonomous operation of the motor vehicle,
    wherein a viewing area is formed in the roof cladding for the environment sensor and in that the viewing area is provided with a cleaning element,
    wherein the cleaning element comprises a fluid nozzle which upon actuation produces a fluid cone, which strikes the viewing area from the outside,
    wherein the roof module further comprises a deflection unit for the fluid delivered by the fluid nozzle,
    wherein the deflection unit comprises an extension element, which extends when the fluid nozzle is actuated, and
    wherein the roof module forms a construction unit configured to be connected to a vehicle body in the manner of a module to form a vehicle roof.

\* \* \* \* \*